(12) United States Patent  (10) Patent No.: US 7,675,709 B2
Guthrie et al.  (45) Date of Patent: Mar. 9, 2010

(54) MAGNETIC WRITE HEAD HAVING A STAIR NOTCHED, STEEP SHOULDERED POLE AND A WRITE GAP BUMP

(75) Inventors: Hung-Chin Guthrie, Saratoga, CA (US); Wen-Chien David Hsiao, San Jose, CA (US); Jyh-Shuey Lo, San Jose, CA (US); Aron Pentek, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 652 days.

(21) Appl. No.: 11/525,789

(22) Filed: Sep. 21, 2006

(65) Prior Publication Data

US 2008/0074782 A1 Mar. 27, 2008

(51) Int. Cl.
G11B 5/31 (2006.01)
G11B 5/187 (2006.01)

(52) U.S. Cl. .................................. 360/125.51; 360/122

(58) Field of Classification Search ............ 360/125.42, 360/125.46, 125.51, 125.59, 125.64, 122
See application file for complete search history.

(56) References Cited

U.S. PATENT DOCUMENTS

| | | | | |
|---|---|---|---|---|
| 5,168,409 A * | 12/1992 | Koyama et al. | ............. | 360/317 |
| 6,072,672 A | 6/2000 | Westwood | ................... | 360/126 |
| 6,163,436 A * | 12/2000 | Sasaki et al. | ............ | 360/125.42 |
| 6,339,524 B1 * | 1/2002 | Furusawa et al. | ............ | 360/317 |
| 6,456,460 B1 | 9/2002 | Connolly et al. | ............. | 360/126 |
| 6,473,276 B1 | 10/2002 | Chang et al. | ................. | 360/317 |
| 6,480,355 B1 | 11/2002 | Kamijima | ................... | 360/126 |
| 6,539,610 B1 | 4/2003 | Lo et al. | ................... | 29/603.07 |
| 6,731,460 B2 | 5/2004 | Sasaki | ......................... | 360/126 |
| 6,742,241 B1 * | 6/2004 | Sasaki | ...................... | 29/603.07 |
| 6,747,850 B1 | 6/2004 | Chang et al. | ................. | 360/317 |
| 6,987,643 B1 * | 1/2006 | Seagle | ................... | 360/125.42 |
| 7,124,498 B2 * | 10/2006 | Sato | ......................... | 29/603.13 |
| 2003/0048581 A1 * | 3/2003 | Ohtomo et al. | ............. | 360/126 |

* cited by examiner

*Primary Examiner*—Andrea L Wellington
*Assistant Examiner*—Gustavo Polo
(74) *Attorney, Agent, or Firm*—Zilka-Kotab, PC (57) ABSTRACT

A magnetic write head structure that maximizes write field strength while minimizing stray fields. The write pole structure maximizes write field strength by minimizing saturation of the magnetic pole tips, and minimizes stray field writing by preventing magnetic fields from extending laterally from the sides of the magnetic pole. The write head structure includes a write pole having a pole tip configured with a stair notched shape and a steep shouldered base beneath the stair notched portion. This configuration maximizes the amount of flux that can be delivered to the pole tip while also avoiding stray fields. The magnetic pole can also be configured with wing shaped extensions that extend laterally from the pole tip region but which are recessed from the ABS by a desired amount. The magnetic write head structure can be manufactured by forming a magnetic pole with a raised portion, depositing a write gap material over the magnetic pole and then forming a magnetic pedestal over the magnetic pole and write gap, the pedestal having a width significantly smaller than the width of the raised portion of the magnetic pole, a first ion mill can then be performed to notch and trim the magnetic pole. Then a non-magnetic layer such as alumina can be deposited and a second ion mill performed to form a stair notched configuration. An alumina bump can be formed prior to ion milling to provide a mask for forming the laterally extending, recessed wings in the pole tip of the magnetic pole.

10 Claims, 12 Drawing Sheets

MAGNETIC WRITE HEAD HAVING A STAIR NOTCHED, STEEP SHOULDERED POLE AND A WRITE GAP BUMP

FIELD OF THE INVENTION

The present invention relates to magnetic write heads for magnetic data recording, and more particularly to a magnetic write head having a narrow P1 pole with a stepped notch and a sloping shoulder, and having a bump formed in the write gap, all for improved magnetic performance.

BACKGROUND OF THE INVENTION

The heart of a computer's long term memory is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider into contact with the surface of the disk when the disk is not rotating but, when the disk rotates, air is swirled by the rotating disk. When the slider rides on the air bearing, the write and read heads are employed for writing magnetic impressions to and reading magnetic impressions from the rotating disk. The read and write heads are connected to processing circuitry that operates according to a computer program to implement the writing and reading functions.

In recent read head designs a spin valve sensor, also referred to as a giant magnetoresistive (GMR) sensor, has been employed for sensing magnetic fields from the rotating magnetic disk. The sensor includes a nonmagnetic conductive layer, hereinafter referred to as a spacer layer, sandwiched between first and second ferromagnetic layers, hereinafter referred to as a pinned layer and a free layer. First and second leads are connected to the spin valve sensor for conducting a sense current therethrough. The magnetization of the pinned layer is pinned perpendicular to the air bearing surface (ABS) and the magnetic moment of the free layer is located parallel to the ABS, but is free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to cos $\theta$, where $\theta$ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

Magnetization of the pinned layer is usually fixed by exchange coupling one of the ferromagnetic layers (AP1) with a layer of antiferromagnetic material such as PtMn. While an antiferromagnetic (AFM) material such as PtMn does not in and of itself have a magnetization, when exchange coupled with a magnetic material, it can strongly pin the magnetization of the ferromagnetic layer.

The magnetic signals are written to the magnetic medium by a write head that includes an electrically conductive write coil that passes between first and second poles. The poles are joined at a back gap region and separated from one another by a write gap in a pole tip region near the ABS. When a current passes through the coil, a resulting magnetic flux in the magnetic yoke generated a fringing magnetic field that extends between the pole tips fringes out to write a magnetic signal onto an adjacent magnetic medium.

The configuration of the magnetic poles in the pole tip region of the write head is very important to the magnetic performance. For example, the pole tips must have sufficient area to avoid choking off the flow of magnetic flux to the pole tip or saturating the pole tips. Also, since the width of the pole tips defines the track width of the write head, at least one of the poles must have a width that is sufficiently narrow to define a desired narrow track width. A smaller track width means that more tracks of data can be written onto a given amount of disk space. The write element should also be constructed to prevent undesired, stray magnetic fields, such as those that can contribute to adjacent track writing. For example, fields that extend laterally from the sides of the pole tips rather than straight from one pole to the other can result in a signal bleeding to an adjacent track and can interfere with the signal of that adjacent track.

However, in many ways these needs conflict with one another. For example, forming a pole with a narrow track width makes it difficult to avoid choking off the flux and, therefore, reduces magnetic write field strength. In addition, making a write pole that defines a narrow track width and which has a strong magnetic write field can promote stray side fields which can cause adjacent track intereference.

Therefore, there is a strong felt need for a write head structure that can define a very narrow track width, with sufficiently strong field strength and with minimal side writing while also avoiding stray fields. Such a write head structure would also preferably be manufacturable and cost effective to produce.

SUMMARY OF THE INVENTION

The present invention provides a magnetic write head structure that maximizes write field strength while minimizing stray fields. The write pole structure maximizes write field strength by minimizing saturation of the magnetic pole tips, and minimizes stray field writing by preventing magnetic fields from extending laterally from the sides of the magnetic pole. The write head structure includes a write pole having a pole tip configured with a stair notched shape and a steep shouldered base beneath the stair notched portion. This configuration maximizes the amount of flux that can be delivered to the pole tip while also avoiding stray fields. The magnetic pole can also be configured with wing shaped extensions that extend laterally from the pole tip region but which are recessed from the ABS by a desired amount.

The magnetic write head structure can be manufactured by forming a magnetic pole with a raised portion, depositing a write gap material over the magnetic pole and then forming a magnetic pedestal over the magnetic pole and write gap, the pedestal having a width significantly smaller than the width of the raised portion of the magnetic pole, a first ion mill can then be performed to notch and trim the magnetic pole. Then, a non-magnetic layer such as alumina can be deposited and a second ion mill performed to form a stair notched configuration. An alumina bump can be formed prior to ion milling to provide a mask for forming the laterally extending, recessed wings in the pole tip of the magnetic pole.

The steep shoulder of the write pole advantageously prevents magnetic fields from emitting to the sides of the write pole while also funneling as much magnetic flux to the pole tip as possible. The steep shoulders preferably having sides that define an angle of 25-55 degrees, or about 40 degrees, with respect to the down track direction. The stair step notch also helps to maximize the funneling of magnetic flux to the pole tip while preventing side, stray magnetic fields.

The wing shaped portions also help to prevent stray field writing by drawing any stray fields back into the wing shaped portions and away from the medium. The wing shaped portions preferably are recessed a distance R of about 600-1200 nm from the air bearing surface (ABS).

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION OF THE PREFERRED EMBODIMENTS

The following description is of the best embodiments presently contemplated for carrying out this invention. This description is made for the purpose of illustrating the general principles of this invention and is not meant to limit the inventive concepts claimed herein.

Figure 1:
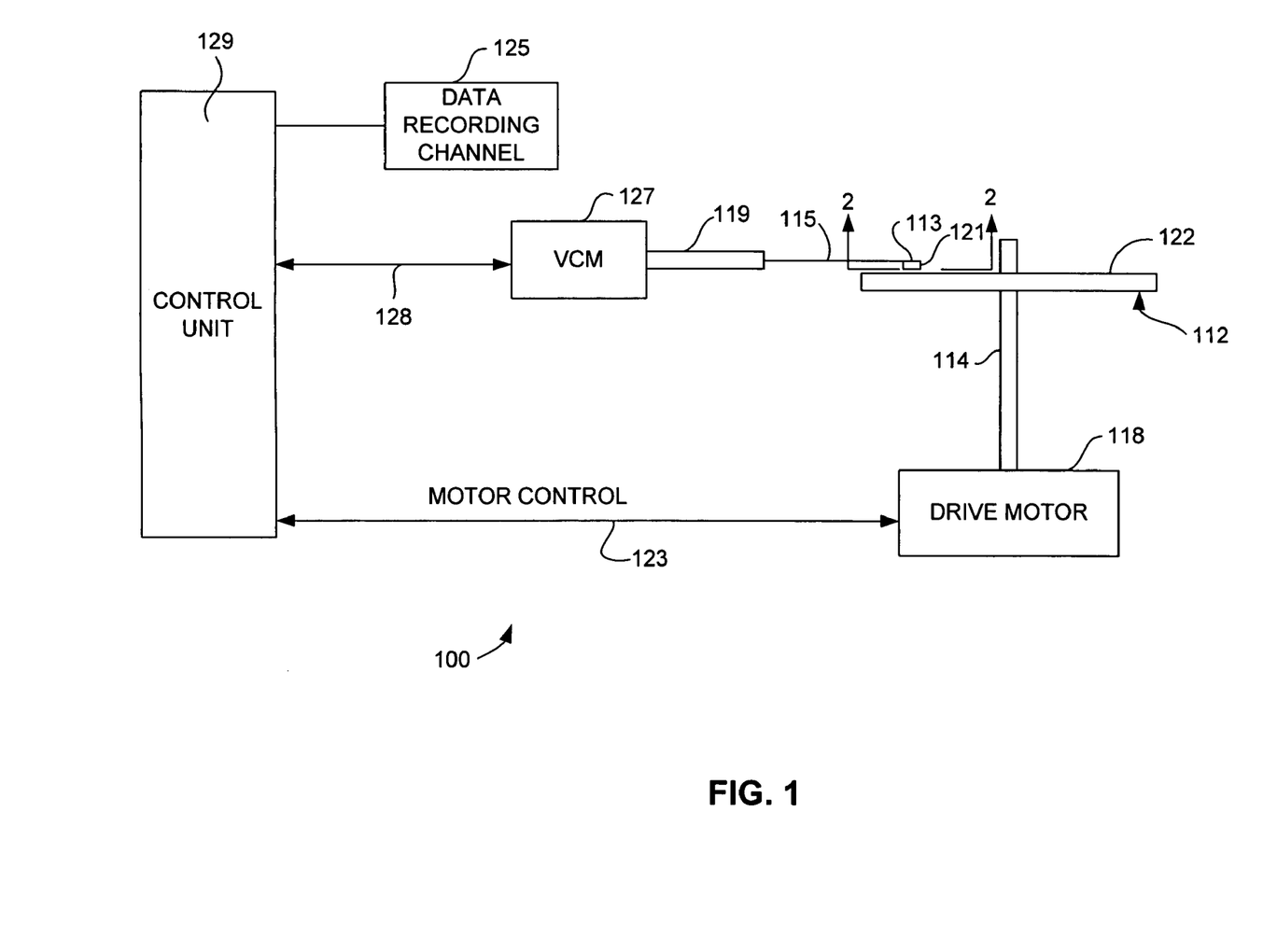
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
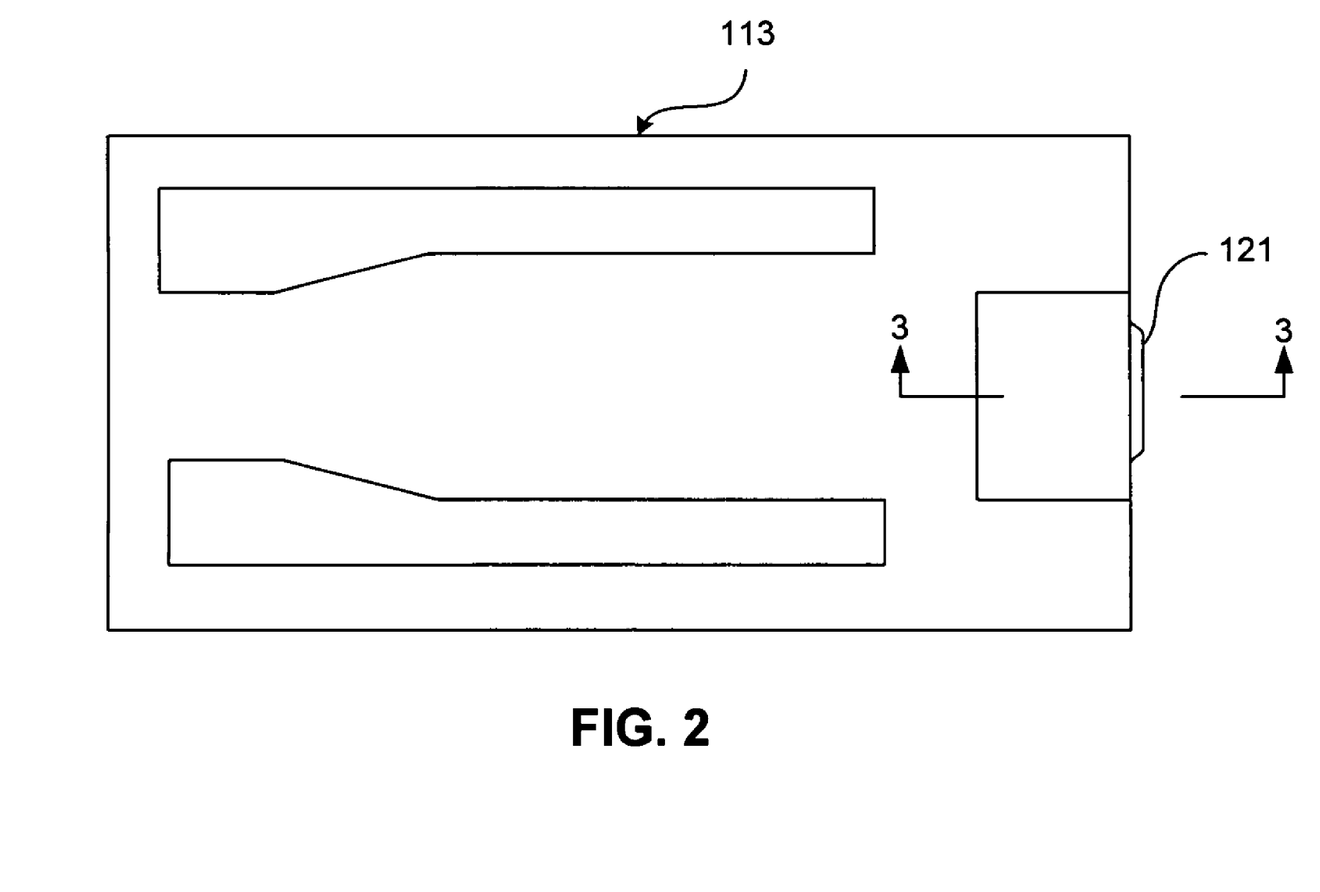
FIG. 2 is an ABS view of a slider illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system, and the accompanying illustration of FIG. 1 are for representation purposes only. It should be apparent that disk storage systems may contain a large number of disks and actuators, and each actuator may support a number of sliders.

Figure 3:
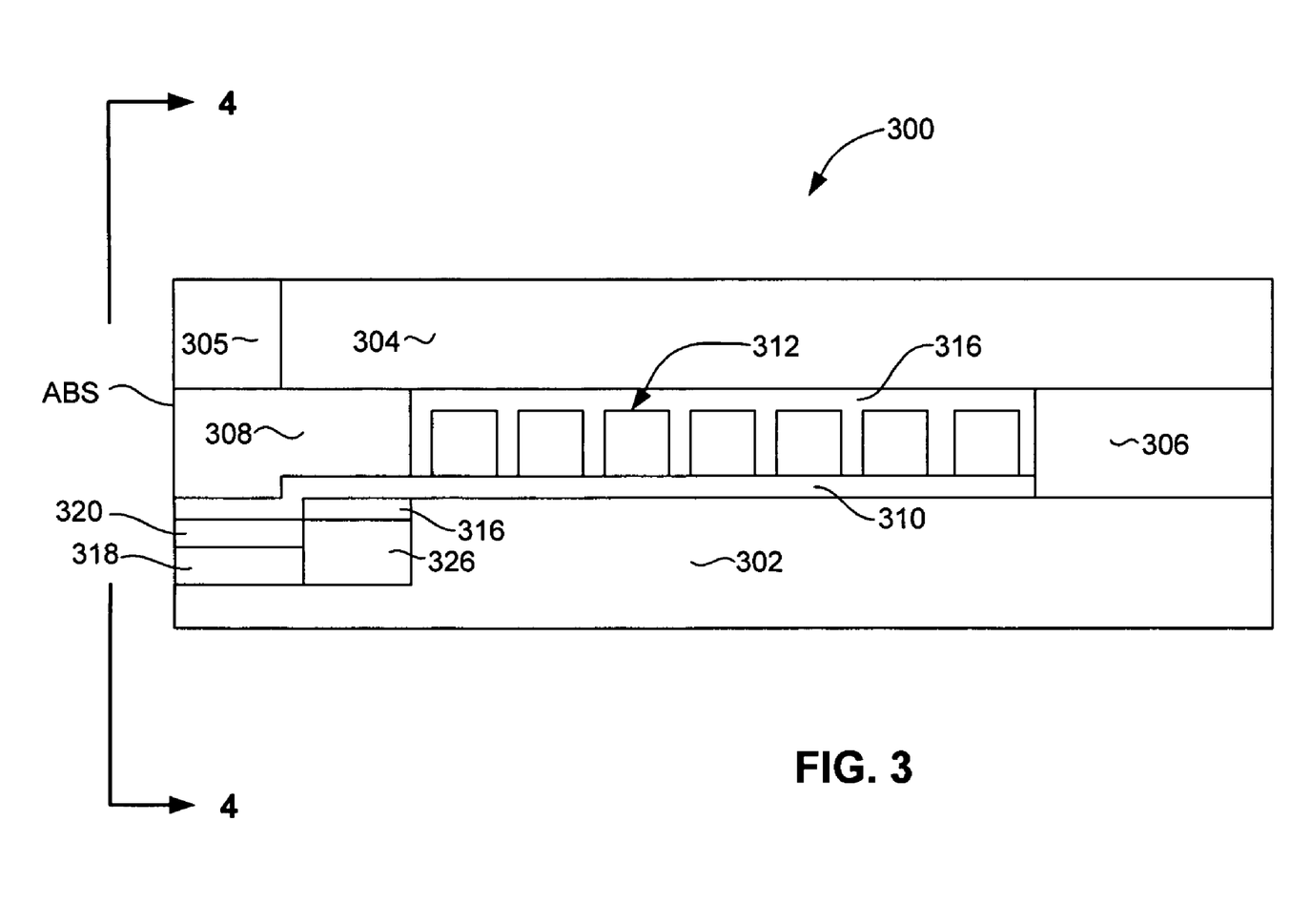
FIG. 3; is cross sectional view of a write head according to a possible embodiment of the invention.

With reference now to FIG. 3, a magnetic write head 300 according to an embodiment of the invention includes a first magnetic pole (P1) 302, and a second magnetic pole (P2) 308 and a third magnetic pole (P3) 304 formed over the second pole 308. The first, second and third magnetic poles are constructed of one or more magnetic materials such as CoFe or NiFe. The first and third magnetic poles 302, 304 are magnetically connected to one another by a back gap structure 306, which can also be constructed of a magnetic material such as NiFe or CoFe. The first and second poles are separated from one another at a pole tip region by a, non-magnetic write gap material layer 310, constructed of, for example, alumina or silicon dioxide. The third pole 304 is recessed from the air bearing surface (ABS), and a hard non-magnetic material 305 such as alumina fills the space between the third pole 304 and the ABS.

An electrically conductive write coil 312 (shown in cross section in FIG. 3) passes between the bottom and top poles 302, 304 to induce a magnetic flux in the magnetic yoke formed by the bottom pole 302, back gap 306 third pole 304 and second pole 308. The write coil 312 is embedded in a non-magnetic, electrically insulating material 314 such as alumina or hard-bake photoresist With continued reference to FIG. 3, a layer of non-magnetic material such as alumina 316 is formed beneath the write gap layer 310, at a location recessed from the ABS to form a write gap bump. This bump, which will be described in greater detail below, improves magnetic performance by reducing stray magnetic fields that could otherwise result in adjacent track interference.

Figure 4:
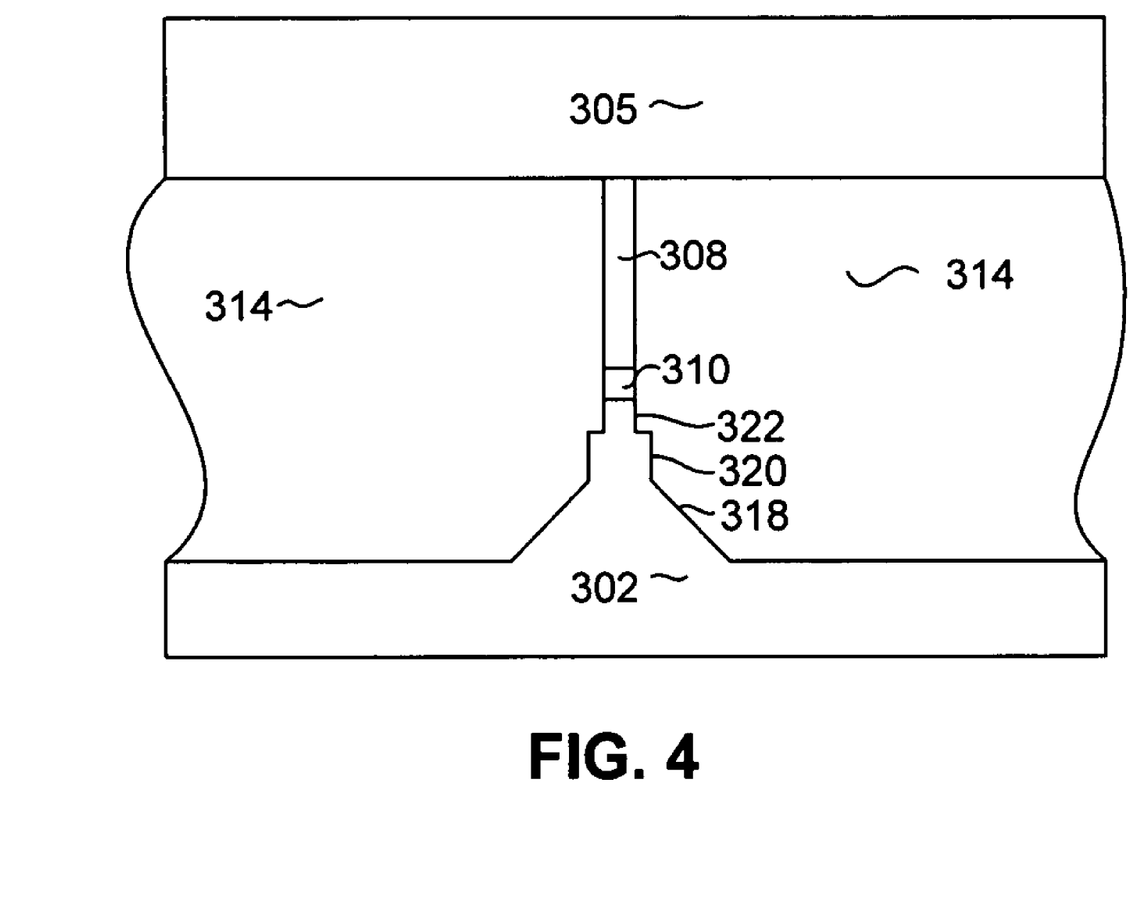
FIG. 4 is an ABS view, taken from line 4-4 of FIG. 3.

With reference now to FIG. 4, it can be seen that, at the ABS, the pole tip portion of the first pole 302 is configured with steep shoulders 318. Above the steep shoulder portion 318 is a stair stepped portion 320. Above the stair stepped portion is a self aligned notched portion 322. The self aligned notch 322 is aligned with the narrow P2 pedestal 308, and the notched portion 322 and pedestal 308 define the narrow trackwidth of the write head 300.

Figure 5:
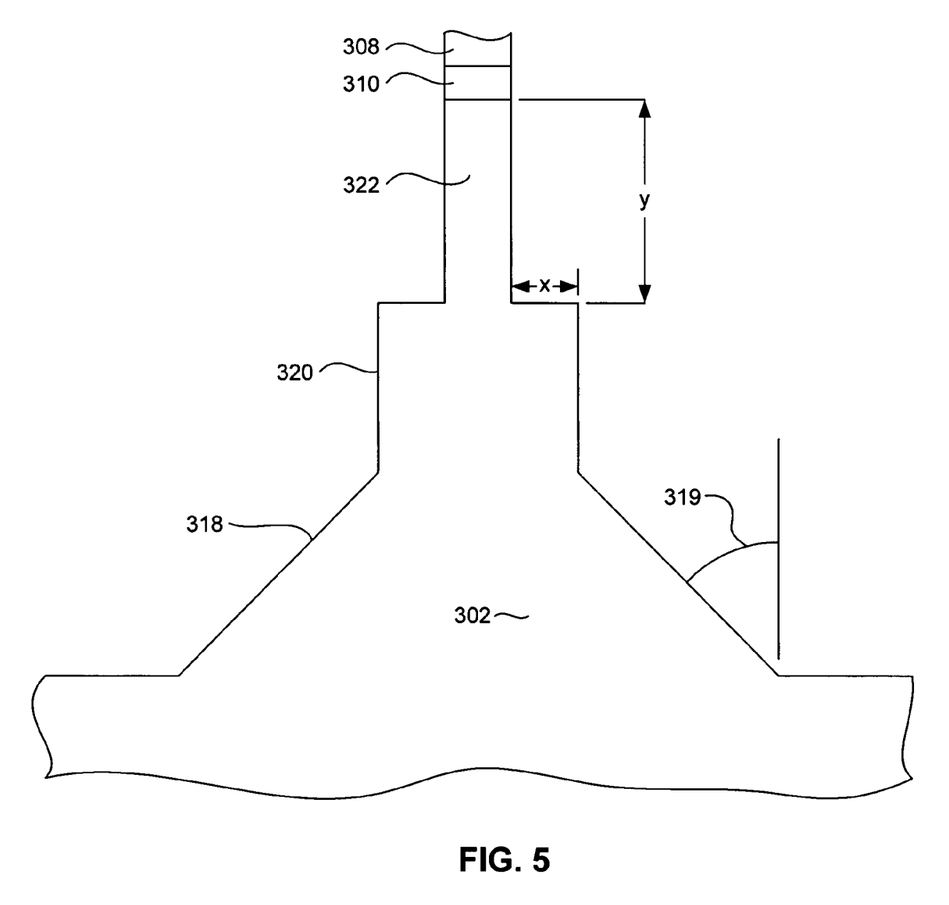
FIG. 5 is an enlarged ABS view of a pole tip portion of a lower magnetic pole of a write head according to an embodiment of the invention.

These features of the bottom pole 302 can be seen more clearly with reference to FIG. 5, which shows an enlarged ABS view of the pole tip portion of the bottom pole 302. Both the stair stepped notch 320 and steep shoulder 318 provide optimal write head performance by avoiding magnetic saturation at the pole tip, while also preventing stray magnetic fields, such as side fields. For the best magnetic performance, the steep shoulder portion 318 preferably forms an angle 319 of 25-55 degrees (or about 40 degrees) with respect to vertical as shown in FIG. 4 (ie, the down track direction).

With continued reference to FIG. 5, it can be seen that the stair step 320 extends laterally (x) from each side of the notched portion 322. The notched portion 322 extends upward (ie. in the down-track direction) a distance (y). For optimal performance the distance x is about ⅓-⅕ the distance y. For example, x can be 0.03 um plus or minus 0.05 um. The distance y can be 0.15 um plus or minus 0.05 um.

Figure 6:
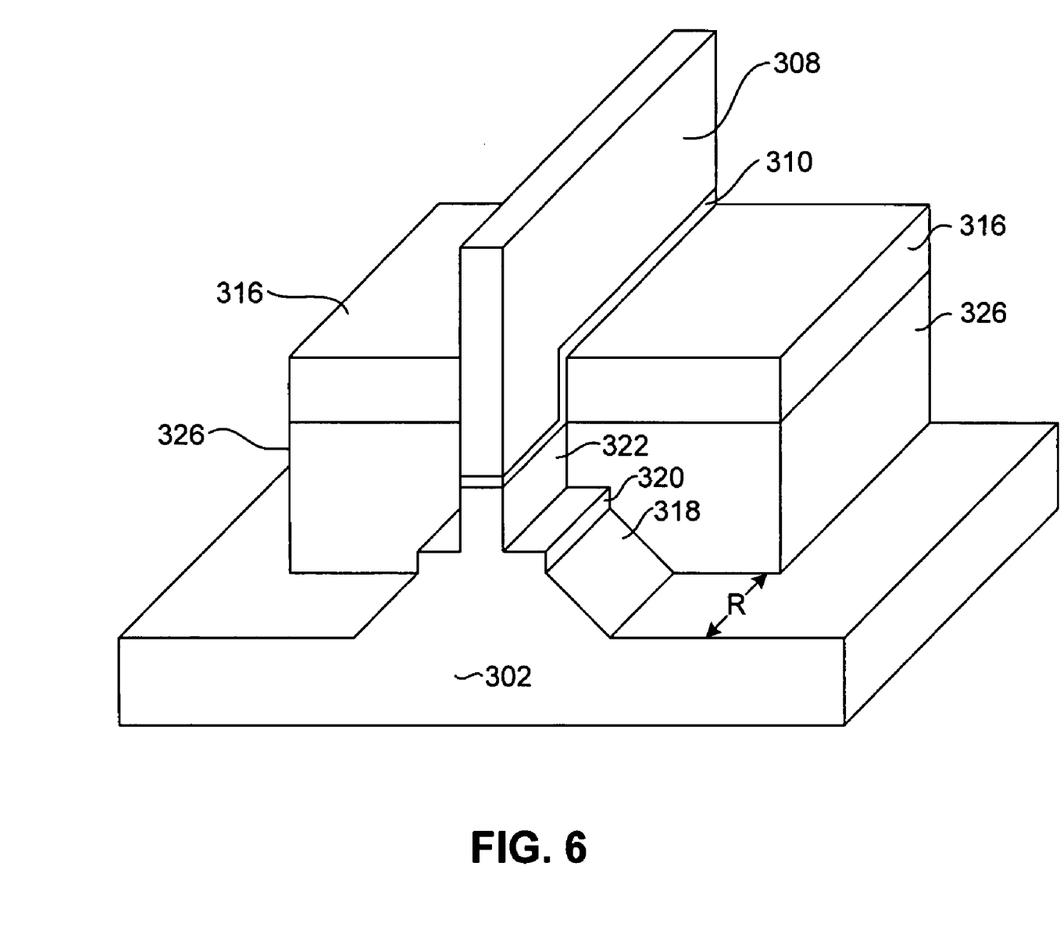
FIG. 6 is a perspective view of a pole tip region of a write head according to an embodiment of the invention.

FIG. 6 shows an isometric view of the pole tip region of the write head 300. With reference to FIG. 6, it can be seen that the first pole 302 can be formed with laterally extending wing portions 326. These wing portions 326 are optional, but have been found to improve magnetic performance The laterally extending wing portions 326, which are formed in the first pole structure 302 improve magnetic performance of the write head by further preventing side writing. Should any magnetic field be emitted from the sides of the pole tip structure 322, this field will be drawn back toward the wing portions 326 away from the magnetic medium, thereby preventing side writing to the medium.

It can also be seen that the pedestal structure 308 does not flair out, but remains narrow beyond the location of the laterally extending wing portions 326. It has been found that this configuration provides optimal magnetic performance in avoiding side writing while providing a strong narrow magnetic write field. The wing portions 326 are recessed from the ABS by a distance R that is preferably 600-1200 nm. A layer or bump 316, constructed of a material that is resistant to ion milling is provided over the wing portion 326, and is useful in the manufacture of the wing portions 326. This will be better understood upon reading the following description of an exemplary method for constructing a write head according to an embodiment of the invention. The bump 316 may be constructed of alumina ($Al_2O_3$), but could be constructed of some other material, and will hereinafter be referred to as an alumina bump 316.

Figure 7:
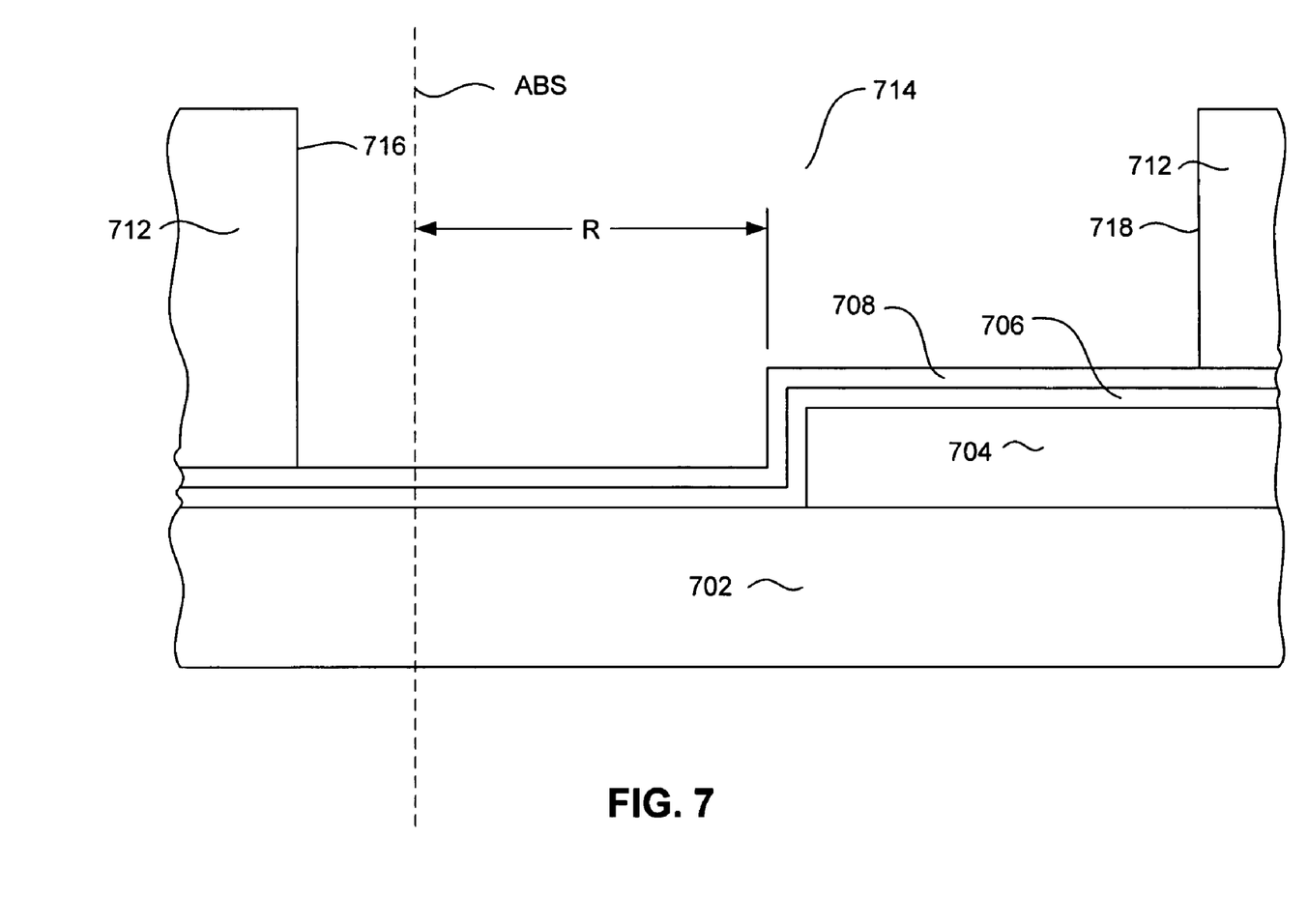
FIGS. 7-12 are cross sectional views of a write head in various intermediate stages of manufacture illustrating a method for manufacturing a write according to an embodiment of the invention.

FIGS. 7-12 illustrate a method for constructing a write element 300 according to an embodiment of the invention. With particular reference to FIG. 7, a bottom magnetic pole 702 is formed as a layer of magnetic material such as NiFe, CoFe, etc. This bottom magnetic pole can be constructed by electroplating a magnetic material onto a substrate (not shown), which can be for example a layer of alumina formed over a read head (also not shown). A layer 704 of material that is resistant to ion milling, such as alumina, is formed over the bottom pole 702. Although other materials could be used, the layer 704 is preferably alumina and will be referred to herein as an alumina bump 704. The alumina bump has an edge that terminates a desired recess distance (R) from an intended Air Bearing Surface plane (ABS) and extends from that edge away from the ABS.

With continued reference to FIG. 7, a layer of write gap material 706 such as alumina or silicon dioxide is deposited over the bottom pole 702 and the alumina bump 704. Then, an electrically conductive seed layer 708 is deposited over the write gap layer 706. The seed layer 708 can be deposited, for example, by sputtering. A frame mask 712 is then formed over the seed layer 708 to from an opening 714 to define the second pole P2 structure. The mask therefore, has a front edge 716 that is located beyond the ABS location and a back edge 718 that is located at some distance beyond the recess (R), so that the opening 714 extends from a front edge beyond the ABS to a location over the alumina bump 704. The mask 712 can be constructed of photoresist, which can be photolithographically patterned and developed to form it with the above described shape.

Figure 8:
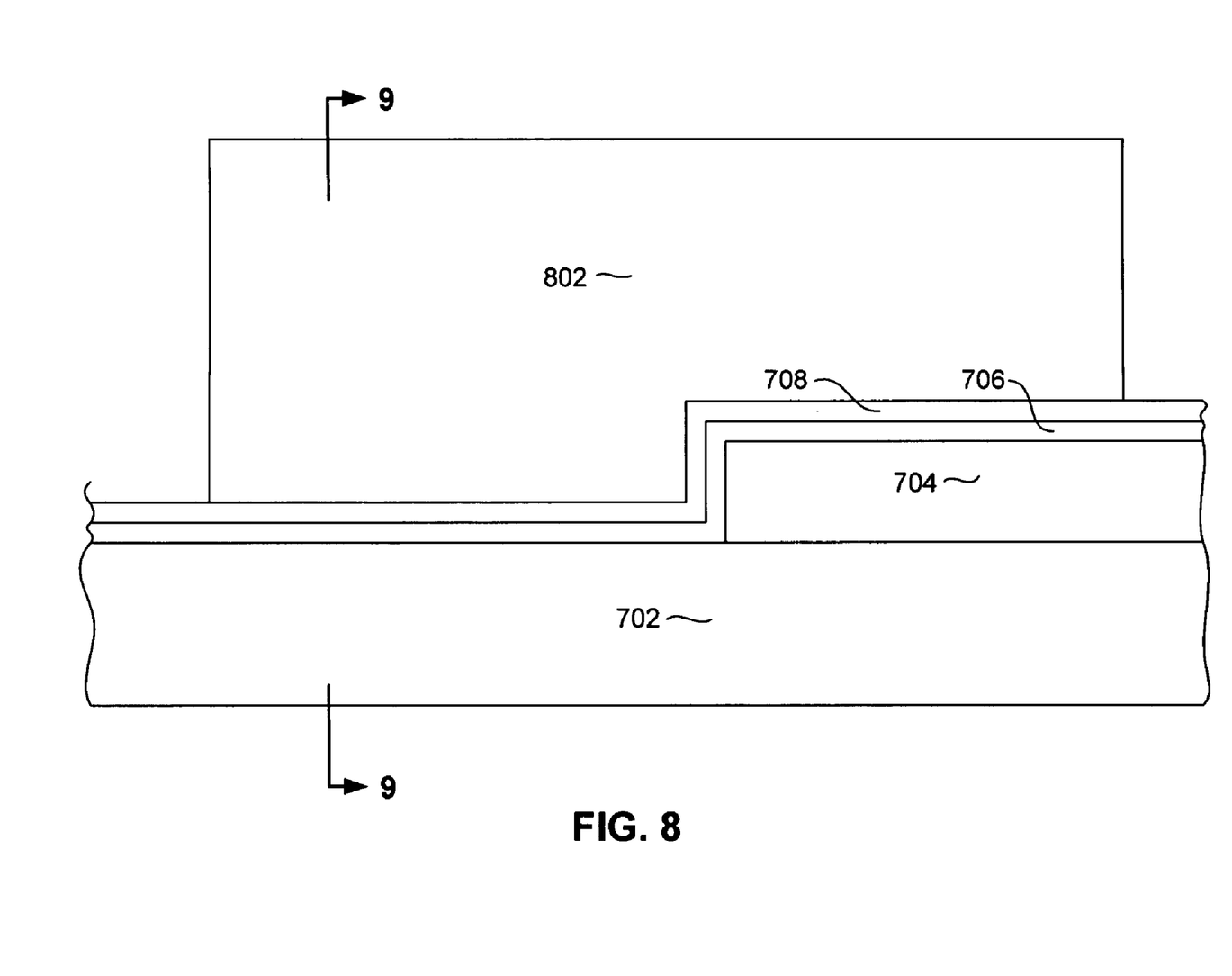

With reference now to FIG. 8, a P2 pedestal structure 802 is formed by electroplating a magnetic material such as CoFe or NiFe into the opening 714 in the photoresist frame 712 (FIG. 7). After the plating, the photoresist frame 712 can be lifted off, such as by chemical lift-off, leaving the structure as shown in FIG. 8.

Figure 9:
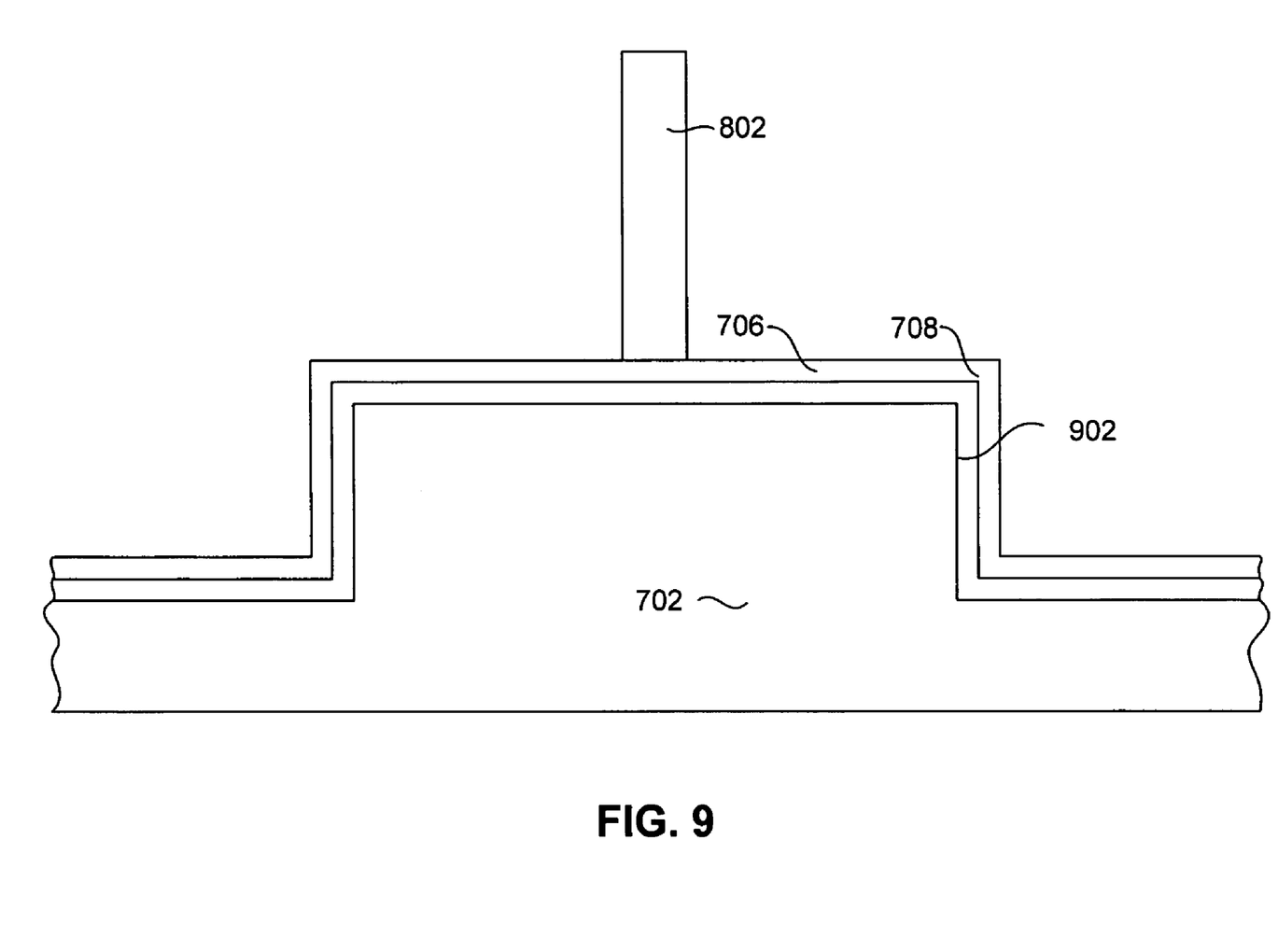

FIG. 9 shows a view perpendicular to that shown in FIG. 8, as taken from line 9-9 of FIG. 8. This is sectional view along a plane that would be parallel with the ABS plane (FIG. 7). With reference now to FIG. 9, it can be seen that the bottom pole 702 has a raised portion 902 formed beneath, and extending laterally from the pedestal 802. This raised portion extends through the ABS and can be formed by an additive process that involves plating a bottom portion of the pole 702 and then plating a raised portion or pedestal 902 over the first portion of the pole 702. Alternatively, the raised portion can be formed by plating a thick bottom pole 702, covering the portion over which the raised portion 902 will be formed with a mask, and then ion milling to remove pole material 702 from the beyond the sides of the raised portion 902. It should be pointed out that this raised portion only temporarily has the configuration shown in FIG. 9 and should not be confused with the wing portion 326 described with reference to FIG. 5.

Figure 10:
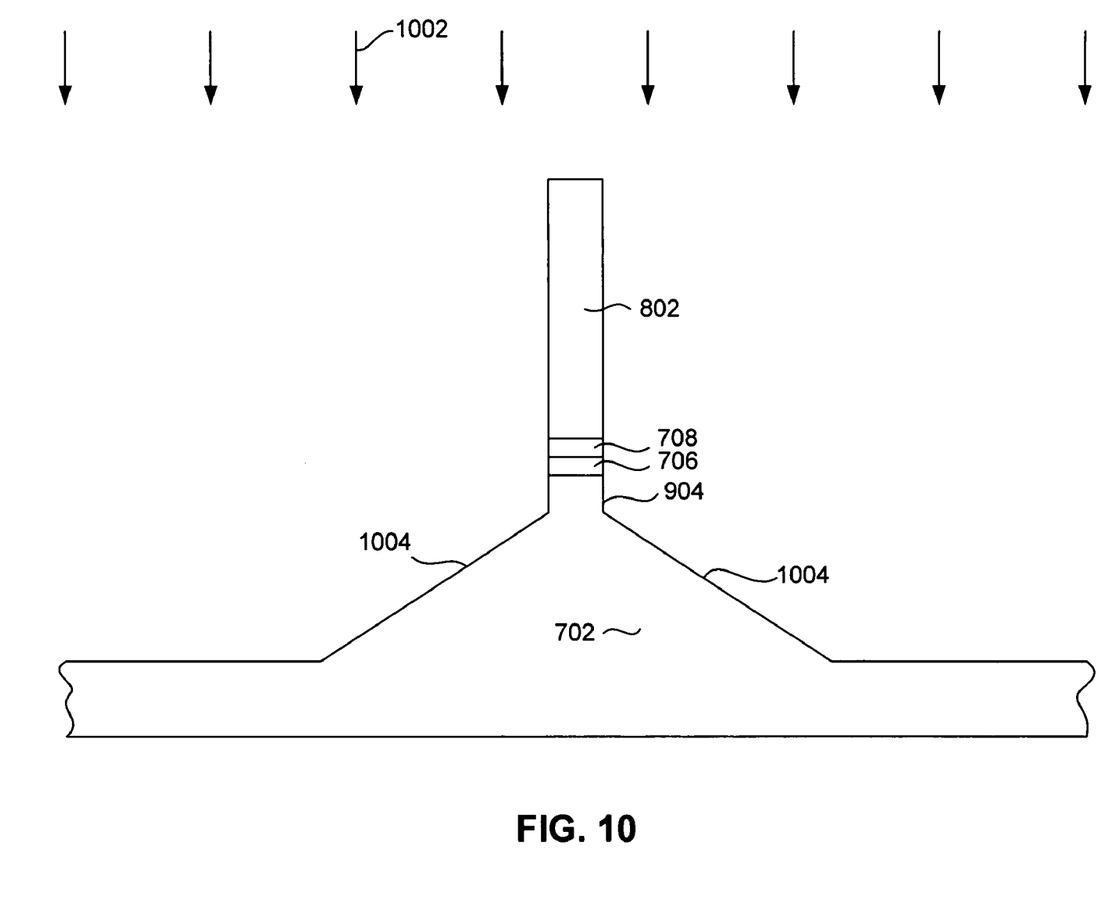

With reference to FIG. 10, a material removal process such as ion milling 1002 is performed. Using the P2 pedestal as a mask, the ion mill (or other process) 1002 removes portions of the bottom pole material 702 write gap 704 and seed layer 708 that are not protected by the P2 pedestal. The ion mill 1002 is preferably a double trim notching ion mill that includes a first mill at a first angle relative to normal, and a second ion mill at a second angle relative to normal. The first ion mill is preferably 25-45 deg with respect to normal, and the second angel is preferably 50-70 deg relative to normal. Shadowing from the P2 pedestal allows the material closer to the P2 pedestal to be removed at a slower rate than material further away further away from the P2 pedestal 802. This causes the raised portion 902 described above with reference to FIG. 9 to have sloping sides 1004.

Figure 11:
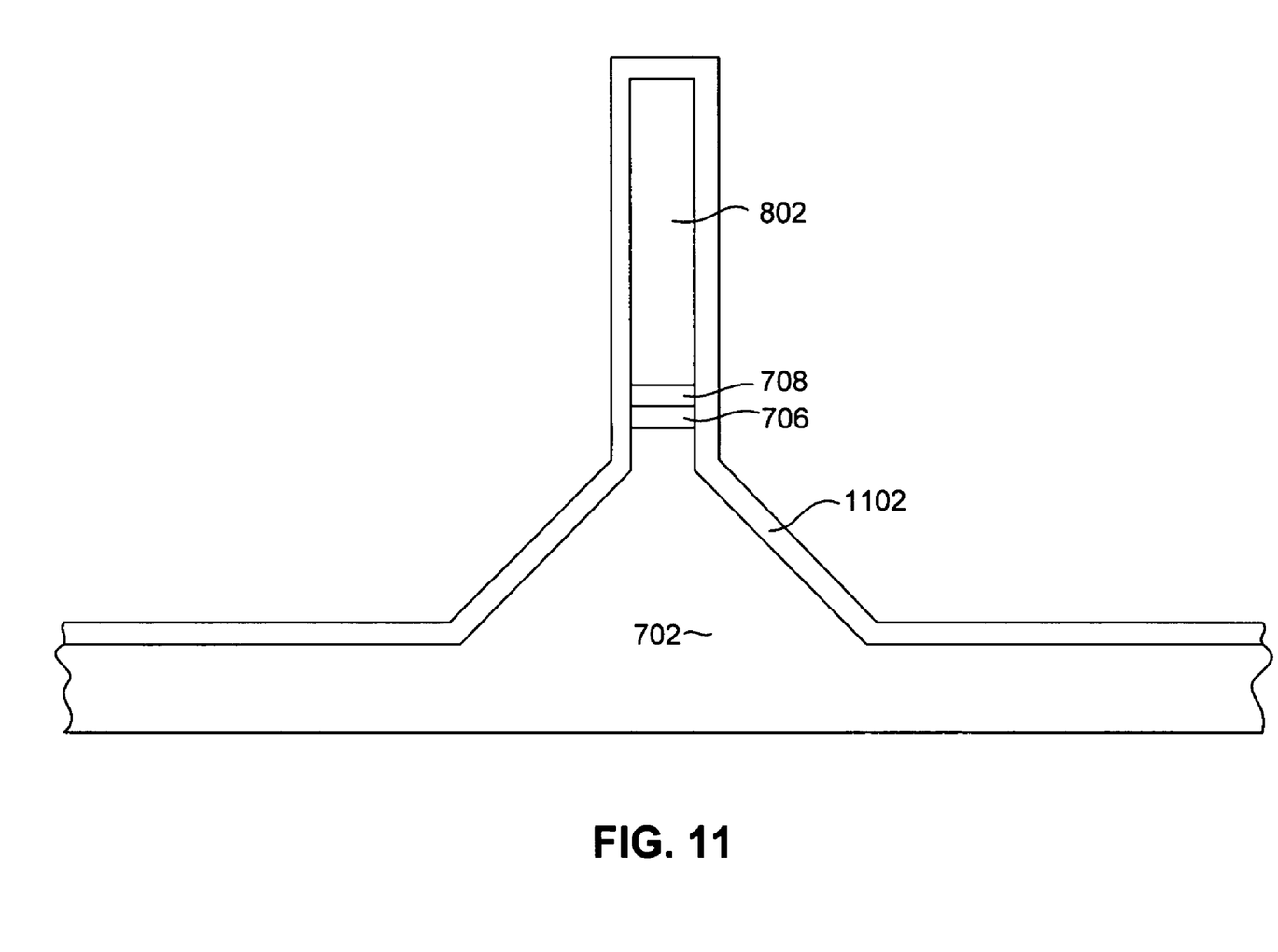

With reference now to FIG. 11, a layer of alumina ($Al_2O_3$) 1102 or some other suitable material is deposited over the P2 pedestal 802 and bottom pole 702. Although various materials and deposition method are possible, the layer 1102 is preferably alumina and is preferably deposited by a conformal deposition method such as atomic layer deposition (ALD) chemical vapor deposition (CVD), etc.

Figure 12:
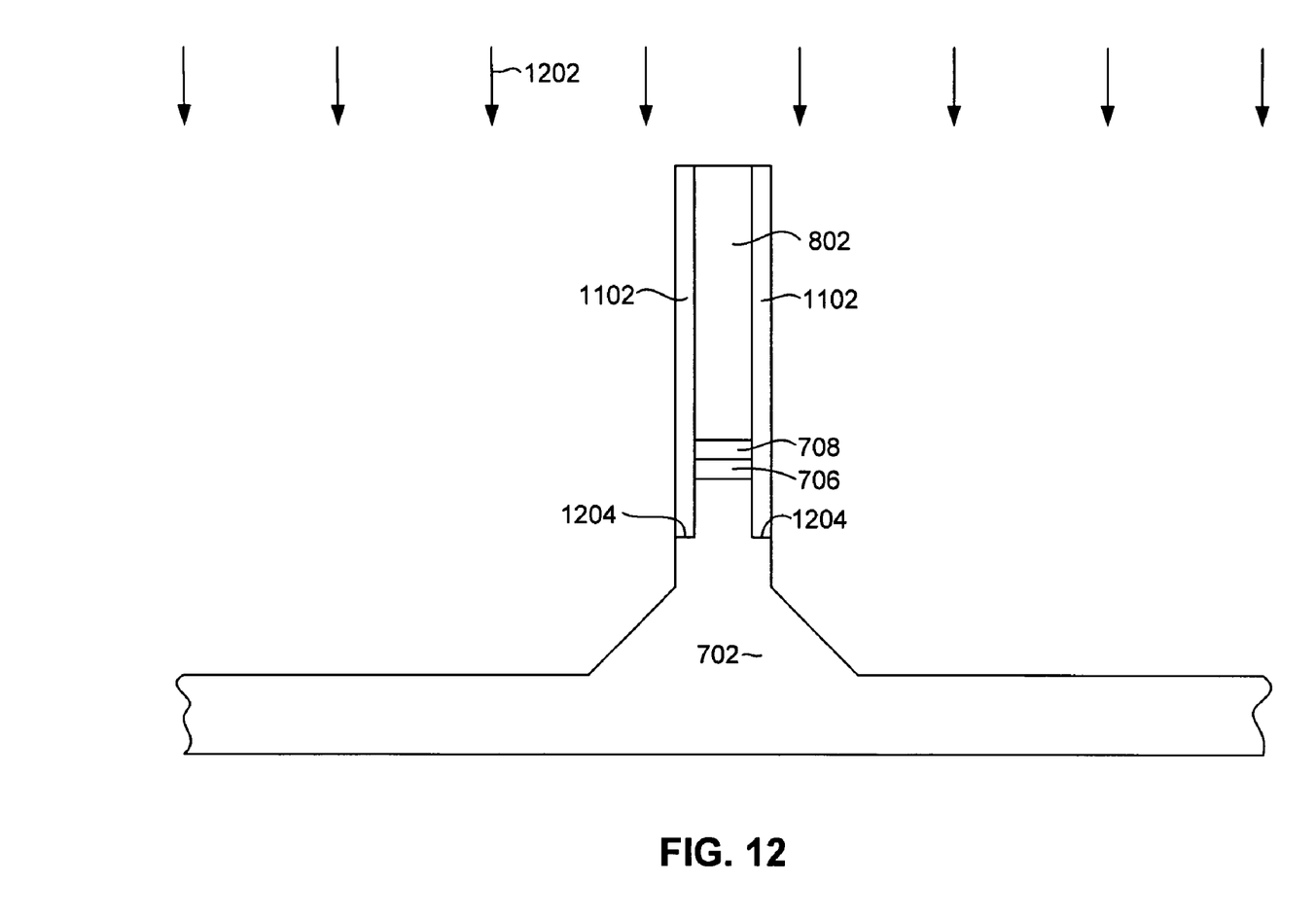

Then, with reference to FIG. 12, a material removal process 1202 such as ion milling is performed. The ion milling 1202 (or other process) preferentially removes horizontally disposed material. Therefore, the ion milling 1202 leaves side walls of the material 1102 (alumina side walls), and notches further into the bottom pole 702. This results in the stair stepped shape described earlier with reference to FIGS. 3-6. The thickness of the alumina layer 1102 and duration and strength of ion milling deposited determine the lateral extension of the step 1204 (dimension x in FIG. 5). Since some of the vertical alumina side walls 1102 will be consumed by the ion milling 1202, the alumina layer 1202 as deposited (FIG. 11) should be deposited slightly thicker than the desired width of the step 1204. For example the alumina layer 1102 can be deposited to a thickness of about 1000 Angstroms. The ion milling 1202 is preferably performed in such a manner to leave sloping side walls 1202 that form an angle of about 25-55 degrees or about 40 degrees with respect to normal (ie. the down track direction). This may involve milling at one or more angles with respect to normal.

It should be pointed out that the alumina layer 704 (FIG. 7-8) protects the portion of the pole layer 702 disposed beneath it during the ion milling 1002 (FIG. 10) and 1202 (FIG. 12). This results in the advantagous wing shaped portions 326 described in FIG. 6. After the ion milling 1202 has been performed to form the write pole 702 with the desired notched sloping pole tip shape and desired wing portions 326, the write pole can be completed by forming a write coil, depositing a layer of alumina or hard-baked photoresist and forming a top magnetic pole layer over the pedestal 802. These processes will be familiar to those skilled in the art and are, therefore, not discussed herein.

While various embodiments have been described above, it should be understood that they have been presented by way of example only, and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A magnetic write head for magnetic data recording, the write head having an air bearing surface (ABS) and comprising:
    a magnetic pole having an end disposed toward the air bearing surface and an opposite end disposed away from the ABS; and
    a non-magnetic write gap material formed over the magnetic pole, the write gap material extending from the ABS to a location between the ABS and the opposite end;
    wherein the end of the magnetic pole disposed toward the air bearing surface is configured with a stair stepped notch portion and a steep shoulder portion, the stair stepped notch portion including a first portion having first and second parallel sides that define a first width there-between and a second portion having third and fourth parallel sides that define a second width there-between that is larger than the first width, the first portion being located between the write gap and the second portion, the second portion extending from the first portion to the steep shoulder portion.

2. A write head as in claim 1 wherein the magnetic write head has a direction that defines a down track direction, and wherein the steep shoulder portion has first and second sides that define an angle of 25 to 55 degrees with respect to the down-track direction.

3. A write head as in claim 1 wherein the magnetic write head has a direction that defines a down track direction, and wherein the steep shoulder portion has first and second sides that define an angle of about 40 degrees with respect to the down-track direction.

4. A write head as in claim 1 wherein the stair stepped portion is configured with a step having a lateral width x located at a distance y from the write gap material and wherein x is ⅓ to ⅕ y.

5. A write head as in claim 1 wherein the magnetic pole is configured with first and second laterally extending wing portions that are recessed from the ABS.

6. A write head as in claim 1 wherein the magnetic pole is configured with first and second laterally extending wing portions that are recessed from the ABS by a distance R, wherein R is 600-1200 nm.

7. A write head as in claim 1 further comprising a layer of alumina (alumina bump) disposed between the magnetic pole and the write gap at a location recessed from the ABS.

8. A write head as in claim 1 further comprising a layer of alumina (alumina bump) disposed between the magnetic pole and the write gap, the alumina bump having a front edge disposed toward the ABS and a back edge opposite the ABS, the front edge being recessed from the ABS by a distance R, wherein R is 600-1200 nm.

9. A write head as in claim 1 further comprising:
    a layer of alumina (alumina bump) disposed between the magnetic pole and the write gap, the alumina bump having a front edge that is disposed toward the ABS and a back edge disposed away from the ABS, the front edge being recessed from the ABS; and
    wherein the magnetic pole has first and second wing portions each recessed from the ABS and having a front edge that is aligned with the front edge of the alumina bump.

10. A write head as in claim 1 further comprising:
    a layer of alumina (alumina bump) disposed between the magnetic pole and the write gap, the alumina bump having a front edge that is disposed toward the ABS and a back edge disposed away from the ABS, the front edge being recessed from the ABS a distance R that is 600-1200 nm; and
    wherein the magnetic pole has first and second wing portions each having a front edge that is recessed from the ABS by the distance R.

* * * * *